United States Patent Office 3,511,898
Patented May 12, 1970

3,511,898
PREPARATION OF GRAFT COPOLYMERS USING ION-EXCHANGE BONDING
Henri G. G. Dekking, Fullerton, Calif., assignor to Union Oil Company of California, Los Angeles, Calif., a corporation of California
No Drawing. Filed Mar. 9, 1964, Ser. No. 350,579
Int. Cl. C08f 15/38
U.S. Cl. 260—885                    10 Claims

ABSTRACT OF THE DISCLOSURE

The invention comprises graft copolymers comprising a polycation or polyanion backbone which is ionically bonded to a graft polymer which has a single, terminally-positioned, base exchange group having a charge opposite the ionically charged groups of the backbone and which is ionically bonded to the ion exchange groups of the polyion backbone. The invention also relates to a method for the preparation of these copolymers by base exchanging an azo free radical precursor having ion exchange groups onto the ion exchange sites of the polyion and thereafter decomposing the azo compound by homolytic fission to form free radicals which are ionically bonded to the backbone polyion and which initiate and propagate a polymer from the polyion backbone.

---

This invention relates to graft copolymers, to a method for their preparation and, in particular, to a method for the propagation of a polymer from a grafting site on a polymeric base.

This invention comprises the preparation of graft copolymers by the adduction of a polyion, i.e., a polycation or a polyanion with an ionically terminated polymer. In a second embodiment this invention comprises the adduction of such a polyion with an ionic polymerization initiator followed by initiation of polymerization with the resulting adduct.

It is known that polyion polymers can be prepared by the homo- or co-polymerization of various monomers containing an ionizable radical. Such polyions can be prepared by the homo-polymerization of, for example, acrylic acid or vinyl pyridine or the co-polymerization of such monomers with other monomers. The resultant polymer contains the recurring radicals along its chain in proportion to the amount of the radical bearing monomer in the polymer.

I have now found that the ionizable polymers so obtained can be readily employed as a polymeric backbone for grafting of suitable polymers that contain a terminally positioned ionic group. In a preferred embodiment, I have discovered that various ionically charged polymerization initiators ,e.g., ionic azo compounds, can be base exchanged onto the ion exchange sites of the polyion and thereafter employed to initiate polymerization of various synthetic polymers so as to propagate a polymer chain from such sites.

Polyions which form the base or starting substrate upon which the ionically terminated polymer is grafted are the subject matter of U.S. Pat. 2,795,567 on polycations and 2,883,356 on polyanions. The disclosure of the aforementioned patents is herein incorporated by reference.

The following equations represent the adduction of the polyions with the ionically charged organic polymer or polymerization initiator, Equation I representing the adduction of the polyanions and Equation II representing the adduction of the polycations:

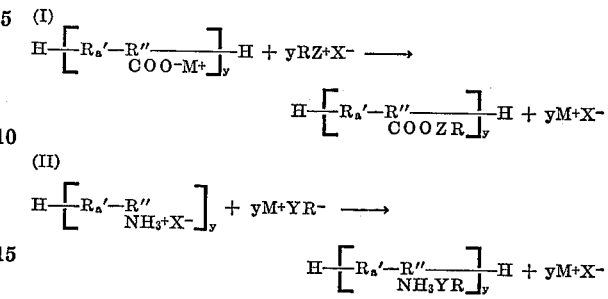

wherein:
said polyion is a homopolymer or random copolymer;
  $a$ is from 0 to 1000, preferably from 0 to 200;
  $R'$ and $R''$ represent organic monomers;
  $y$ is whole number from about 5 to about 1000;

R represents an ionically charged organic adduct, i.e., the synthetic polymer bearing a terminally positioned ionically charged group or an ionically charged polymerization initiator;

Z represents a suitable cationic radical attached to the R group;

Y represents a suitable anionic radical attached to the R group;

X represents a suitable inert and water soluble anion; and

M represents a suitable inert and water soluble cation.

The aforementioned reactions take place under base exchange conditions hereinafter specified in greater detail so as to form the organic adduct.

As disclosed in 2,883,356, the polyanions employed in reaction I include the polymers of various unsaturated aliphatic mono- and polycarboxylic acids or salts thereof. Examples of such are the homopolymers of the acrylic acids, e.g., polyacrylic acid, polymethacrylic acid, polyethylacrylic acid, etc., as well as copolymers of the aforementioned with various vinyl monomers such as vinyl chloride, styrene, vinyl formate, vinyl acetate, vinyl methyl ether, vinyl ethyl ether, etc. Copolymers of alpha, beta-unsaturated dicarboxylic acids such as maleic acid, maleic anhydride, citraconic acid, etc. with the aforementioned vinyl compounds can also be employed. Polar monomers can be employed to obtain water soluble polyanions; however, various non-polar monomers such as ethylene, propylene, isobutylene, styrene, α-methyl styrene, etc., can also be copolymerized with any of the aforementioned unsaturated carboxylic acids.

The polycations are disclosed in Pat. 2,795,567 as of the type termed "ethylenic" polymers, i.e., polymers prepared by vinyl polymerization or polymerization of at least one mono-olefinic compound through aliphatic unsaturation, said polymers having numerous side chains distributed along a substantially linear, continuous carbon atom chain. Moderate branching and cross-linking of this chain are permissible. The sidechains can be all of one type or can be of different types so long as some contain basic groups, e.g., heterocyclic amino nitrogen groups, amino alkyl groups, etc. The number of such groups and the relative proportions of the hydrophilic and hydrophobic groups being such as to provide a polymeric compound having a substantially large number of ionizable radicals which give rise to a cationic polymer molecule by electrolytic dissociation in water. As described in the aforesaid patent, such polymers or polycations can be derived by the homopolymerization of the vinyl pyridines, e.g., 4-methyl vinyl pyridine, 2-ethyl vinyl pyridine, the N-vinyl amines, N-allyl amines, etc. Any of the aforementioned vinyl monomers can be homopolymerized or can be copolymerized with various other vinyl monomers such as vinyl acetate, vinyl formate, vinyl chloride, acrylonitrile, styrene, acrylic acid esters, methacrylic acid esters, ethylene, propylene, isobutylene, alpha methyl styrene, alkyl vinyl ethers, acrylonitrile, methacrylonitrile, etc.

Various polycations can also be obtained by the hydrogenation of polyacrylonitrile or polymethacrylonitrile or copolymers of acrylonitrile and methacrylonitrile with any of the aforementioned vinyl monomers. Polycations can also be obtained by the polymerization of various amino esters of unsaturated acids, e.g., the polymerization of esters obtained by the esterification of methacrylic acid, acrylic acid, fumaric acid, maleic acid with alkylol amines such as ethanolamine, triethanolamine, etc.

The aforementioned polyion polymers can be prepared by any conventional polymerization technique employed for the polymerization of ethylenically unsaturated monomers. In general, such techniques comprise the bulk polymerization of the monomers or the polymerization of the monomers in a reaction medium such as water, in solution, or as an emulsion. Various initiators for the polymerization such as peroxide or azo compounds can be employed, e.g., benzoyl peroxide, ditertiary butyl peroxide, lauroyl peroxide, or $\alpha,\alpha$-azobisisobutyronitrile, diazonium halides, etc.

The organic polymers that are grafted to the aforementioned polyion polymers preferably contain a single ionically charged group that is terminally positioned on the polymer chain. The ionically charged group can be in general any group containing an ion exchange property, e.g., a basic nitrogen or a carboxylic acid group.

Organic polymers containing a terminally positioned basic nitrogen group can be prepared by any of several methods.

In one method, available for a limited number of polymeric materials, amine terminated polymers can be obtained by anionic chain homo- or copolymerization of vinyl monomers. This polymerization is initiated by an amide ion that becomes an integral part of the polymer. The polymerization is performed in liquid ammonia and is initiated by the addition of an alkali metal such as sodium, potassium, cesium, etc., with a suitable catalyst to form the amide ion in situ. Any of the following monomers can be polymerized or copolymerized in this manner to produce amine terminated polymer and copolymer chains: styrene, acrylonitrile and methacrylonitrile.

Various copolymers such as styrene-acrylonitrile copolymer, styrene-methacrylonitrile copolymer, acrylonitrile-methacrylonitrile copolymer, etc. can also be obtained in this manner. The polymerization is performed in ammonia at atmospheric or superatmospheric pressure so as to maintain the ammonia in a liquid phase. Generally between about 1 and 200 atmospheres are employed and the polymerization is performed at temperatures between about $-75°$ and about $120°$ C., the lowest temperatures tending to favor the highest molecular weight polymers. The resultant polymers contain a primary amine at the end of the polymer chain and this amine can be readily converted to an ammonium salt for base exchange with the polyion backbone in the manner hereafter described.

Amine terminated synthetic polymers can also be obtained from the polymerization of a variety of vinyl monomers with azo compounds having the following structure:

$$R_1-N=N-R_2$$

Wherein at least one and preferably both $R_1$ and $R_2$ contain a basic nitrogen group; and $R_1$ and $R_2$ are selected from the class consisting of aryl, alkaryl, aminoaryl, amidinylaryl, aminoalkaryl, amidinylalkaryl, alkyl, amidinylalkyl, aminoalkyl, aralkyl, amidinylaralkyl and aminoaralkyl.

Preferably, the cationic azo compounds have secondary or tertiary carbons vicinal to the azo nitrogen. Representative of this class of bi-functional azo compounds are the following:

Where $R_1$ is aryl ar alkaryl and $R_2$ is aminoalkyl, amidinylalkyl, aminoaralkyl or amidinylaralkyl: phenylazomethylamine, phenylazopropylamine, 2-naphthylazomethylamine, p-tolylazobutyramidine, p-tolylazoisopropylamidine, p-tolylazopentylamidine, $\alpha$(phenylazo)$\beta$-aminocumene, $\alpha$(tolylazo)$\beta$ - aminocumene, $\alpha$(phenylazo) p-aminotoluene, etc.

Where $R_1$ is aryl or alkaryl and $R_2$ is aminoaryl, amidinylaryl, aminoalkaryl, or amidinylalkaryl; 4-aminoazobenzene, 3-aminoazobenzene, N,N'-dimethyl-4-aminoazobenzene, 1-amino-2,2'-azonaphthalene, etc.

Where $R_1$ is alkyl or aralkyl and $R_2$ is aminoalkyl, amidinylalkyl, aminoaralkyl or amidinylaralkyl: aminodiazomethane, methylazobutyramidine, 2-methylazoisopropylamine, $\alpha$-ethylazo, $\beta$-aminocumene, $\alpha$-methylazophenylamine, etc.

Where $R_1$ is alkyl or aralkyl and $R_2$ is aminoaryl, amidinylaryl, aminoalkaryl or amidinylalkaryl: p-aminophenylazomethane, o-aminoxylylazoisopropane, 6-amino-2-naphthylazoethane, 2-(p-aminophenyl)-1-phenylethane, etc.

Where $R_1$ and $R_2$ contain amino or amidinyl groups: 4,4'-diaminoazobenzene, 3,3'-dimethyl - 4,4' - diaminoazobenzene, 6(p-aminophenylazo) - 2 - naphthylamine, 2,2'-azobisisobutyramidine, $\alpha,\alpha'$-azobis - (p - quanyltoluene), azobisisopropylamine, azobismethylamidine, etc.

In a preferred embodiment, $R_1$ and $R_2$ are a single alkylene group, thereby forming a heterocyclic azo compound. These heterocyclic initiators are represented by the following:

wherein:

R is selected from the class consisting of alkylene, alkylalkylene, arylalkylene;

X is a basic nitrogen group; and the total carbons in said compound is between about 2 and 20.

Preferably, these heterocyclic azo compounds have secondary or tertiary carbons vicinal to the azo nitrogen. Representative of the aforementioned azo compounds are: 3,5-diamidinyl-1,2-diaza-1-cyclopentene, 3-methyl-3,4-diamidinyl-1,2-diaza - 1 - cyclopentene, 3-ethyl-3,5-diamidinyl-1,2-diaza - 1 - cyclopentene, 3,5-diamidinyl-1,2-diaza-1-cyclohexene, 3-propyl-3,6-diamidinyl-1,2-diaza-1-cyclohexene, 3 - isopropyl - 3,6-diamidinyl-1,2-diaza-1-cyclohexene, 3 - amyl - 6-methyl-3,6-diamidinyl-1,2-diaza-1-cyclohexene, 3-phenyl - 3,5 - diamidinyl-1,2-diaza-1-cyclopentene, 3,5 - diphenyl - 3,5-diamidinyl-1,2-diaza-1-cyclopentene, 3-methyl - 5 - phenyl-3,5-diamidinyl-1,2-diaza-1-cyclopentene, 3 - phenyl-3,6-diamidinyl-1,2-diaza-1-cyclohexene, 3,6 - diphenyl - 3,6 - diamidinyl-1,2-diaza-1-cyclohexene, 3-(p-aminophenyl)-1,2-diaza-1-cyclopentene, 3,5-di(aminomethyl) - 1,2-diaza-1-cyclopentene, 3-aminoisopropyl - 1,2 - diaza-1-cyclohexene, 3-ethyl-6-(o-aminophenyl) - 1,2 - diaza-1-cyclohexene, 3,8-diamidinyl-1,2-diaza - 1 - cyclooctene, 5-(p-aminophenyl)-1,2-diaza-1-cyclodecene, etc.

The aforementioned cyclic azo compounds can be readily obtained from the corresponding diketone compound by reacting, in the first step, the diketone with hydrogen cyanide and hydrazine at temperatures between about $0°$ and $100°$ C. and pressures sufficient to maintain liquid phase conditions. The ensuing reaction forms a heterocyclic hydrazine which can thereafter be oxidized with bromine to yield the heterocyclic compound containing the azo linkage that bridges the original ketocarbons to form the ring and which also contains an appendant nitrile group from each of the former keto-carbons of the parent compound. The dinitrileazocyclo compound can thereafter be converted to an amidinyl compound by treating it with an alcoholic solution of a halogen acid, e.g., hydrogen chloride in ethanol at temperatures from about 0° to 14° C. and thereafter contacting with ammonia at a temperature between about 5° and 20° C. to convert the nitrile groups to amidinyl groups.

In reaction II, carboxylic or sulfonic acid radicals and salts thereof can be employed as the anionic group on the organic addent to serve as the link between the polycation and the synthetic polymer. Polymers which contain a single, terminally positioned carboxylic acid group can be obtained by the polymerization of a variety of vinyl monomers with initiators such as azo compounds having the following structure:

$$R_3N=NR_4$$

wherein:

At least 1 and preferably both $R_3$ and $R_4$ contain an anionic group such as a carboxylic or sulfonic acid radical; and $R_3$ and $R_4$ are selected from the class consisting of aryl, alkaryl, carboxyaryl, carboxyalkaryl, carboxyalkyl, carboxyaralkyl, sulfoaryl, sulfoalkaryl, sulfoalkyl and sulfoaralkyl.

As with the aforedescribed cationic azo compounds, the anionic azo compounds also preferably have secondary or tertiary carbons vicinal to the azo nitrogen. Representatives of this class of bifuctional azo compounds are the following: 5,5'-azo-bis-5-cyanohexanoic acid, 2,2'-azo-bis - 2 - cyanobutyric acid, 4,4'-azo-bis-5-cyanooctanoic acid, α,α' - azo - bis - α-methyl-p-toluic acid, 4,4'-azo-bispentanoic acid, 2,2'-azo-bis-2-cyanopentanoic acid, α,α'-azo-bis-p-ethylbenzene sulfonic acid, azobenzene sulfonic acid, etc.

The aforementioned azo carboxylic acids can be prepared by known chemistry; see Journal of the Chemical Society, 1955, p. 4256. Briefly, the preparation comprises reacting, at a temperature of about 25° to 70° centigrade, a keto-acid or the alkali metal salt of the acid in an aqueous medium with hydrazine sulfate and sodium cyanide to form the sodium salt of an azine-bis-cyanoacid, treating the sale to liberate the acid and then oxidizing the azine-bis-cyano acid to the azo-bis-cyano acid by treatment with bromine at about −5° to 10° C. If desired, the sodium cyanide can be eliminated to avoid introducing a cyano group in the acid; however, the resultant azone compound must then be hydrogenated to obtain the hydrazine. Typical of starting materials are the following: levulinic acid, acetoacetic acid, acetophenone carboxylic acid, acetobutyric acid, acetovaleric acid, etc.

The azo sulfonic acids can be prepared by a similar reaction on the sulfonated ketone, e.g., the reaction of acetophenone sulfonic acid with hydrazine sulfate to prepare the α,α'-bis-azine-p-ethylbenzene sulfonic acid which can be hydrogenated by treatment with hydrogen over a noble metal catalyst to prepare the hydrazine that can then be oxidized with bromine to α,α'-bis-azo-p-ethylbenzene sulfonic acid. In another preparation, azo sulfonic acids can be prepared by azo coupling with nitrous acid of aminoaryl sulfonic acids such as orthanilic acid.

Heterocyclic anionic azo initiators can also be prepared and used with the same advantage as use of the heterocyclic cationic azo initiators, namely, reduction in the amount of uncombined polymer in my graft propagation method. Again, these initiators have the general formula:

wherein:

X is a carboxylic or sulfonic acid radical;

R is selected from the class consisting of carboxyalkylene, carboxyarylalkylene, carboxyalkylalkylene, sulfoalkylene, sulfoarylalkylene, and sulfoalkylalkylene; and The total number of carbons in said compound is between about 3 and 20.

Representative of the aforementioned compounds are: 3,5-dicarboxy-1,2-diaza-1-cyclopentene, 3,5-dimethyl-3,5-dicarboxy-1,2-diaza-1-cyclopentene, 4(p-carboxyphenyl)-1,2 - diaza - 1-cyclopentene, 5-(2-carboxyisopropyl)-1,2-diaza-1-cyclodecene, 3-methyl-5-sulfophenyl-1,2-diaza-1-cyclopentene, 3,7-dimethyl-5-sulfophenyl-1,2-diaza-1-cyclopentene, etc. These cyclic initiators can be derived from a diketone compound by reaction with hydrogen cyanide and hydrazine to form a dinitrile heterocyclic hydrazine in the manner previously described. To obtain the carboxylic acid derivatives, this compound can then be hydrolyzed at temperatures between about 25° and 100° C., preferably with an acidic aqueous medium to hydrolyze the nitrile groups to carboxylic acid radicals. Then the compound is treated with an oxidant, e.g., bromine to convert the hydrazine to an azo compound in the previously discussed manner. The sulfonic acid heterocyclic azo compounds can be derived by use of a sulfodiketone in the initial reaction, e.g., sulfobenzoylacetone, 4-sulfophenyl-2,6-heptadione, etc.

Any of the vinyl compounds that are readily polymerized by initiation with a free radical can be polymerized by the aforementioned cationic or anionic azo compounds. As employed herein, the term "vinyl polymer" means a substantially linear macromolecule derived by polymerization of at least one monoolefinic compound through aliphatic unsaturation. The term vinyl is thus inclusive of vinyl, vinylene and vinylidene radicals. While it is preferred to employ at least one monoolefinic monomer to obtain a substantially linear polymer, the copolymerization of such a monomer with a diolefin, e.g., butadiene, and even the homopolymerization of a diene is within the scope of my invention. In general, such vinyl monomers include the following:

Hydrocarbon olefins and diolefins such as ethylene, propylene, butene-1, isobutylene, butadiene, pentene-1, isopentene, pentadiene, isoprene, hexene, isohexene, isoheptene, heptadiene, octene, isooctene, nonene, decene, styrene, methylstyrene, vinyl naphthalene, etc.;

Vinyl halides such as vinyl fluoride, vinyl chloride, vinylidene chloride, fluorotrichloroethylene, chlorostyrene, chloroprene, etc.;

Acrylics such as acrylic acid, methacrylic acid, acrylamide, methacrylamide, acrylonitrile, methacrylonitrile, methyl methacrylate, methyl acrylate, ethyl acrylate, ethyl methacrylate, propyl acrylate, isopropyl methacrylate, isobutyl acrylate, amyl methacrylate, hexyl methacrylate, lauryl methacrylate, stearyl methacrylate, etc.;

Vinyl ethers such as ethyl vinyl ether, isopropyl vinyl ether, butyl vinyl ether, etc.;

Vinyl esters such as vinyl acetate, vinyl propionate, vinyl isobutyrate, vinyl benzoate, diallyl phthalate, divinyl terephthalate, vinyl naphthoate, etc.; and Miscellaneous vinyl compounds such as vinyl pyridine, vinyl carbazole, vinyl pyrrolidone, etc.

Any of the aforementioned monomers or mixtures thereof can be polymerized or copolymerized with the free radicals prepared in accordance with my invention using otherwise conventional techniques in the art. Thus, emulsion, bulk or solution polymerization can be employed.

As previously mentioned, the preferred embodiment of my invention comprises base exchanging a suitable ionically charged polymerization initiator onto the polyion polymer and thereafter employing the polyion polymer-initiator complex to initiate polymerization of any of the aforementioned vinyl monomers and thereby graft propagate a polymer chain from the polyion polymer. In this manner, the steric hindrance and relative immobility of long macromolecules of the aforementioned ionically terminated vinyl polymer are averted and a relatively high quantity of a suitable vinyl polymer can be grafted onto the polyion polymer.

In regard to my preferred graft propagation of a polymer chain from the polyion, the use of the aforementioned heterocyclic azo cations or anions affords an advantage in that use of such an initiator reduces the amount of uncombined polymer formed since decomposition of the cyclic initiator merely opens the ring and provides a single fragment bearing a free radical at each end. The decomposition of the acyclic azo initiators divides the compound and yields two fragments, each bearing a free radical that is capable of initiating polymerization. Even when both ends of the acyclic initiator contain a cationic group, some homopolymer can nevertheless form during polymerization because, statistically, not every initiator will be bonded to the polyanion at both cationic groups. This difficulty is avoided by use of the heterocyclic azo initiators since the homolytic fission of the azo nitrogens only opens the ring and does not subdivide the molecule.

The resultant graft copolymer is highly stable even when subjected to base exchange conditions because the vinyl polymer macromolecule that is grafted to the polyion polymer does not readily participate in base exchange reactions that would be necessary to sever it from the polyion polymer. In my preferred embodiment therefore, any of the aforementioned polymerization initiators having one or more ionically charged groups can be base exchanged onto the polyion polymer in accordance with reaction I or reaction II and thereafter employed to graft propagate a vinyl polymer from the initiator.

The resultant polyion polymer-initiator complex can be employed for the initiation of polymerization of any of the aforementioned vinyl monomers by using emulsion, bulk or solution polymerization. These polymerization conditions are hereafter described.

As previously mentioned, reactions I and II are performed under base exchange conditions. Such conditions are generally achieved by contacting the polyion polymer with an aqueous solution or suspension of the terminally positioned ionically charged organic addent, be it the polymer or polymerization initiator, at ambient temperatures, e.g., 0° to about 80° C., preferably 20° to 65° C.

In reaction I, the monocationic addent can have any suitable inert anion associated therewith such as a halide, e.g., chloride, bromide, fluoride, iodide, sulfate, nitrate, hydroxide, phosphate, acetate, propionate, butyrate, etc. As previously mentioned, it is preferred that the particular anion will form a water soluble compound with the cation, $M^+$, of the polyanion polymer so that the organic adduct can be freed of contaminants by water washing. Accordingly, I prefer to use a halide or hydroxide anion; most preferably the chloride.

In reaction II, the monoanionic addent can have any suitable cation associated therewith that is inert with the other reactants and that will form a water soluble compound with the anion on the polyanion polymer. Preferably, alkali metals are employed such as sodium, potassium, lithium, cesium, etc. If desired, however, ammonium or alkaline earth metals such as calcium, magnesium, etc., can be employed. Also if desired any of the transitional metals such as aluminum, copper, iron, cobalt, molybdenum, nickel, etc., can be employed. As previously mentioned, however, due regard is exercised in choice of the particular cation, $M^+$, and anion, $X^-$, so as to preclude the formation of an insoluble compound, MX. Accordingly, I prefer to employ ammonium or alkali metal cations as the anion of the terminally positioned anionically charged polymer.

The base exchange conditions also require that the particular reactants be ionically charged, i.e., possess ion exchange properties. The ion exchange properties can be imparted to the basic nitrogen groups of either the polycation polymer or the terminally positioned cation polymer by dissolving the polymer in a suitable inert solvent such as benzene, chloroform, methyl ethyl ketone, dichlorobenzene, formamide, dimethyl formamide, acetone, hexane, trichloroethane, cyclohexane, isopropyl acetate, ethyl butyrate, toluene, amyl bromide, xylene, n-butyl ether, etc. and thereafter adding a dilute acid to form the cationic group, e.g., the ammonium or amidinium salt of the organic addent. Suitable acids are hydrochloric, acetic, phosphoric, sulfuric, nitric, etc. If desired, the salt can be formed by the addition of organic esters of mineral acids such as methyl sulfate, triethyl phosphate, ethyl nitrate, etc. or by the addition of alkyl halides such as methyl fluoride, ethyl fluoride, etc. By any of these methods, the basic nitrogen of the organic compound is converted to its highest positive valency which upon addition of water gives rise to an organic cation. This is suitably accomplished by the addition of about 0.1 to about 10 parts of water to each part of organic solution.

The ionically terminated organic addent, be it the polymerization initiator or vinyl polymer is thereafter admixed with a suitable dispersion of a polyion polymer, whereupon the polyion polymer-graft copolymer or the polyion polymer-initiator adduct is formed by conventional base exchange as the organic anion for the anion present on the polycation polymer, reaction II or the organic cation for the cation present on the polyanion polymer, reaction I. If desired, it is of course apparent that the several steps described above can be simultaneously performed by the addition of the dilute mineral acid, water and polyion polymer suspension to an organic solution of the organic addent or simply, by the addition of the organic addent to an acidified aqueous suspension of the polyion polymer.

The resultant polyion polymer addent, i.e., graft copolymer or polymerization addent is a very stable product since the ionic bond of the organic addent to the polyion polymer is stable. As previously mentioned, the ionically terminated organic addent is quite large, e.g., a polystyrene macromolecule. Accordingly, the organic addent does not readily base exchange from the polyion polymer because of its high immobility. As a result, the addents are stable and resistant to organic solvents and even to base exchange conditions such as are employed in their formation.

When the ionically terminated organic addent employed in base exchange step I or II is the ionically terminated polymer, the polyion polymer-graft copolymer can be separated from the aqueous solution used in its preparation by any suitable solid-liquid separation techniques and dried.

When the organic addent comprises the polymerization initiator, as in the preferred embodiment of my invention, the polyion polymer-graft copolymer can be directly derived therefrom by addition of suitable quantities of the desired vinyl monomer to the suspension followed by heating of the resultant suspension to the suitable activation temperature to decompose the polymerization initiator and form free radical fragments that initiate the polymerization. If desired, however, the polyion polymer-initiator adduct can be separated from the aqueous solution used in its preparation and the resultant solid can be stored, handled and subsequently employed in a polymerization to obtain the desired products.

The initiator complex so prepared can be employed for the initiation of polymerization of any of the aforementioned vinyl monomers. As previously mentioned, emulsion, bulk or solution polymerization can be employed. The initiator-complex are well suited to bulk, homo- or copolymerization by the dispersion of between about 0.05 and about 10,000 parts by weight of the initiator complex in 100 parts by weight of the monomer, preferably between about 20 and about 2000 parts by weight per 100 parts of any of the aforementioned monomers is employed. The resultant dispersion is thereafter heated, preferably under nitrogen, to between about 25° and about 125° C. to decompose the azo radical and thereby initiate polymerization.

Emulsion homo- or co-polymerization of the aforementioned monomers can also be performed with use of my initiator adduct. Examples of various monomers that can very readily be emulsion polymerized are butadiene, styrene, butadiene-styrene, vinyl acetate, vinyl chloride and acrylic acid esters such as methylmethacrylate, ethylacrylate, lauryl methacrylate, acrylonitrile, etc. In general, the emulsion is formed by the addition to the reactants of about 0.1 to about 5.0 percent (based on the amount of the monomer) of an non-ionic emulsifying agent, e.g., condensates of ethylene oxide with alkylphenols, fatty acids, fatty alcohols, and fatty amides which preferably have hydrophobic groups containing between about 10 and about 24 carbons and between about 14 and 15 ethylene oxide units. Aqueous emulsions containing from 5 to about 300 parts by weight of the monomer in 100 parts water can be used, preferably the monomer is used in an amount between about 10 and about 200 parts per 100 parts of water. The initiator adduct is used in amounts between about 0.04 and about 10,000 parts per 100 parts of monomer; preferably in amounts between about 0.2 and about 200 parts per 100 parts water.

Polymerization of the aforementioned monomers or co-polymerization of mixtures of the monomers can also be conducted in various organic solvents such as benzene, cyclohexane, n-hexane, ethylbenzene, trichlorobenzene, dimethyl formamide, pentane, heptane, acetone, methanol, etc. The monomer or mixture of monomers is added to the solvent, generally in an amount between about 5 and about 300 parts per 100 parts of solvent, preferably between about 10 and about 200 parts per 100 parts. The initiator adduct of my invention can readily be dispersed in any of the aforementioned solvents in the necessary amounts; between about 0.04 and about 500 parts per 100 parts of monomer, preferably between about 0.2 and about 200 parts per 100 parts of monomer are employed. Upon heating to the selected initiation temperature, between about 25° and about 80° C., the azo nitrogen-carbon bonds of the initiator adduct of my invention are homolytically cleaved and free radicals are generated which react with the monomer to initiate polymerization. In any of the aforedescribed polymerization techniques, polyion polymer graft copolymers are obtained wherein the synthetic polymeric material is grafted to the polyion polymer through a cationic group linkage, preferably through a basic nitrogen radical.

The following examples will illustrate my invention and demonstrate the results obtainable therewith:

EXAMPLE 1

A polyion was prepared by the copolymerization of acrylic acid and methylmethacrylate. The copolymer contained 10 weight percent of acrylic acid randomly spaced along the polymer chain.

To 150 milliliters of distilled water were added 7.8 grams of the aforedescribed copolymer and 0.2 gram of azobisisobutyramidine hydrogen chloride. The dispersion was filtered to recover the adduct of the copolymer and the azo compound. No trace of the azo compound was found in the filtrate.

The copolymer-azo adduct was dispersed in 200 milliliters of distilled water and 10.0 grams of acrylamide and 10 milliliters of methanol were added. The mixture was heated under an argon atmosphere to 60–66° C. and maintained at this temperature for about 5 hours. After the 5-hour period, the reactants were poured into methanol and the resultant slurry filtered. The filter cake was powdered and stirred into benzene (a solvent for the copolymer of methylmethacrylate and acrylic acid). The benzene slurry was filtered and dried to yield 8 grams of an insoluble graft copolymer of polyacrylamide on a backbone composed of the methylmethacrylate-acrylic acid copolymer. The polyacrylamide portion of the graft copolymer comprised 3.3 grams or about 41 weight percent.

EXAMPLE 2

An amine terminated polyacrylamide was prepared by adding 50 grams of acrylamide to 400 milliliters of distilled water, heating the solution to 42° C. while purging with nitrogen and thereafter adding 7 grams of isopropyl alcohol and 0.1 gram of azobisisobutyramidine hydrogen chloride. The mixture was held at 45°–50° C. for two hours and then poured into methanol to yield a thick viscous slurry of the polymer. The polyacrylamide was recovered by filtration and dried. Its molecular weight was 516,600 and contained a terminal amine group.

One gram of the aforementioned amine terminated polymer was dissolved in 200 milliliters of distilled water and then one gram of the methylmethacrylate-acrylic acid copolymer prepared in Example 1 was added. The mixture was stirred in a blender for 3 hours and thereafter the water was removed by evaporation.

The resultant solids were extracted with benzene to remove any ungrafted polymer and the insoluble solid contained about 73 weight percent polyacrylamide grafted to a backbone of the methylmethacrylate acrylic acid copolymer.

The preceding examples are intended solely to illustrate a mode of practice of my invention and to demonstrate the results obtainable thereby. The invention is not to be unduly limited by these examples but is intended to be defined by the elements, and their equivalents, of the following composition claims and the steps, and their equivalents of the following method claims.

I claim:

1. The method for propagating a grafted polymer from a synthetic backbone polymer containing anionic or cationic ion exchange radicals along its length and having been prepared by the polymerization through aliphatic unsaturation of ethylenically unsaturated monomers that contain anionic or cationic ion exchange radicals to thereby incorporate said ion exchange radicals along the chain length of said backbone polymer, said method comprising: reacting an organic azo compound having the structure $R_1$—N=N—R wherein both $R_1$ and $R_2$ contain an ion exchange group, said group selected to be anionic when said backbone polymer contains cationic radicals and selected to cationic when said backbone polymer contains anionic radicals, under base exchange conditions so as to form an ionic bond between said organic azo compound and said backbone polymer and thereby form a backbone polymer azo complex; mixing said complex with an ethylenically unsaturated monomer that undergoes polymerization through aliphatic unsaturation by free radical initiation; heating the resultant mixture to decompose the azo radicals of said complex by homolytic fission, thereby obtaining free radicals which are ionically bonded to said backbone polymer and which initiate the polymerization of said monomer to graft propagate said grafted polymer from said backbone polymer.

2. The method of claim 1 wherein said backbone polymer is a polyanion and said azo compound contains cationic nitrogen groups.

3. The method of claim 1 wherein said organic azo compound is acyclic and the ion exchange groups of said organic azo compound comprise a basic nitrogen cationic group and wherein the ion exchange radicals of the backbone polymer are carboxyl.

4. The method of claim 1 wherein said azo compound is azobisisobutyramidine hydrogen chloride and wherein the backbone polymer is a polymer or copolymer of acrylic acid.

5. The method of claim 1 wherein said backbone polymer is a polycation and said azo compound contains anion groups selected from the class consisting of carboxylic and sulfonic acid radicals.

6. The method of claim 1 wherein said azo compound is azobisisobutyramidine hydrogen halide.

7. The method of claim 6 wherein said backbone polymer is a copolymer of acrylic acid and methylmethacrylate, said grafted polymer is a polymer of acrylamide and said azo compound is azobisisobutyramidine hydrogen chloride.

8. The method for propagating a grafted polymer from a synthetic backbone polymer containing anionic or cationic ion exchange radicals disposed along its length and having been prepared by the polymerization through aliphatic unsaturation of ethylenically unsaturated monomers that contain anionic or cationic ion exchange radicals to thereby incorporate said ion exchange radicals along the chain length of said backbone polymer, said method comprising:

reacting an organic azo compound having the structure

wherein X is an ion exchange group, said group selected to be anionic when said backbone polymer contains cationic groups and selected to be cationic when said backbone polymer contains anionic groups under base exchange conditions so as to form an ionic bond between said organic azo compound and said backbone polymer and thereby form a backbone polymer azo complex; mixing said complex with an ethylenically unsaturated monomer that undergoes polymerization through aliphatic unsaturation by free radical initiation; heating the resultant mixture to decompose the azo radicals of said complex by homolytic fission, thereby obtaining free radicals which are ionically bonded to said backbone polymer and which initiate the polymerization of said monomer to graft propagate said grafted polymer from said backbone polymer.

9. The method of claim 8 wherein X is a basic cationic nitrogen group.

10. The method of claim 9 wherein the ion exchange groups of the backbone polymer are carboxylic acid groups.

References Cited

UNITED STATES PATENTS 3,083,118  3/1963  Bridgeford _____ 117—47

OTHER REFERENCES

Imergut et al., Die Makromolekulare Chemie 18/79 Graft and Block-polymers from Synthetic and Natural Macromolecules (1956), p. 327.

Ceresa-Block & Graft Copolymers (1962), pp. 40–41.

MURRAY TILLMAN, Primary Examiner

C. J. SECCURO, Assistant Examiner

U.S. Cl. X.R.

260—875, 877, 881, 883, 898